United States Patent [19]

Campbell

[11] Patent Number: 4,986,500
[45] Date of Patent: Jan. 22, 1991

[54] ADJUSTABLE AIR BRAKE HOSE SUPPORT FOR RAILWAY VEHICLES

[75] Inventor: Ernest J. Campbell, Akworth, Ga.

[73] Assignee: American Standard Inc., Atlanta, Ga.

[21] Appl. No.: 354,942

[22] Filed: May 22, 1989

[51] Int. Cl.⁵ .............................................. F16L 3/00
[52] U.S. Cl. ...................................... 248/53; 24/301; 213/76
[58] Field of Search .................... 248/610, 53, 499; 24/300, 301, 230.5 W, 237; 213/76

[56] References Cited

U.S. PATENT DOCUMENTS

| | | | |
|---|---|---|---|
| 1,298,051 | 3/1919 | Keator | 24/230.5 W |
| 2,601,709 | 7/1952 | Reichardt | 24/230.5 W X |
| 3,424,415 | 1/1969 | Nadherny | |
| 3,587,868 | 6/1971 | Yates | |
| 3,592,425 | 7/1971 | Randolph | |
| 3,784,030 | 1/1974 | Chierici | 248/53 X |
| 4,100,658 | 7/1978 | Nikota | 24/237 X |
| 4,234,998 | 11/1980 | McMickle | 24/237 |
| 4,519,564 | 5/1985 | Nadheeny | 248/58 |
| 4,852,733 | 8/1989 | Blume | 24/237 X |

OTHER PUBLICATIONS

The Car and Locomotive Cyclopedia, Simmons—Boardman Publication, Centennial Edition (1974), p S10-57.

Primary Examiner—David L. Talbott
Attorney, Agent, or Firm—J. B Sotak

[57] ABSTRACT

An adjustable support arrangement for suspending an air brake hose from the coupler of a railway vehicle including an elongated rubber bungee and a pair of spring wire clip connectors. The rubber bunges includes a resilient circular cross-section intermediate portion and two rectangular cross-section end portions, each having a plurality of axially spaced elongated through holes. Each of the pair of spring wire clip connectors including a hook portion, which is threaded through a selected one of the elongated holes formed in the respective ends of the rubber bungee, and including a thumb-engaging loop portion for opening and closing the spring wire clip connectors and for being interlocked with the hook portion when excessive deformation occurs to either of the spring wire clip connectors.

20 Claims, 2 Drawing Sheets

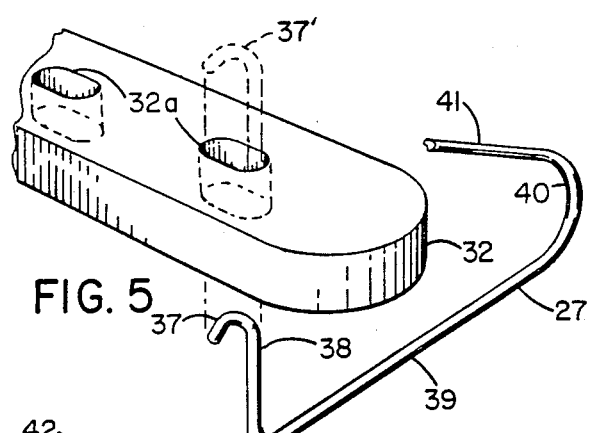
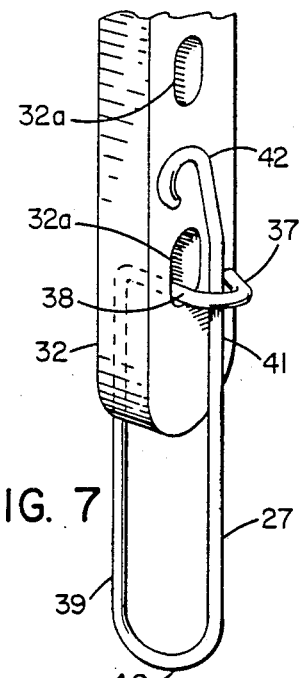
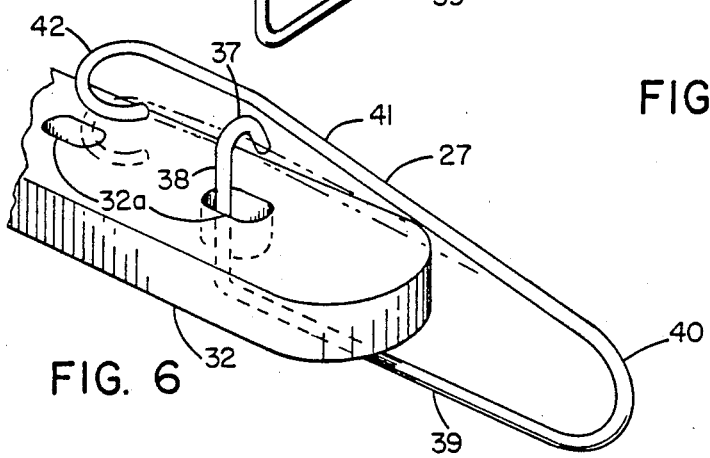
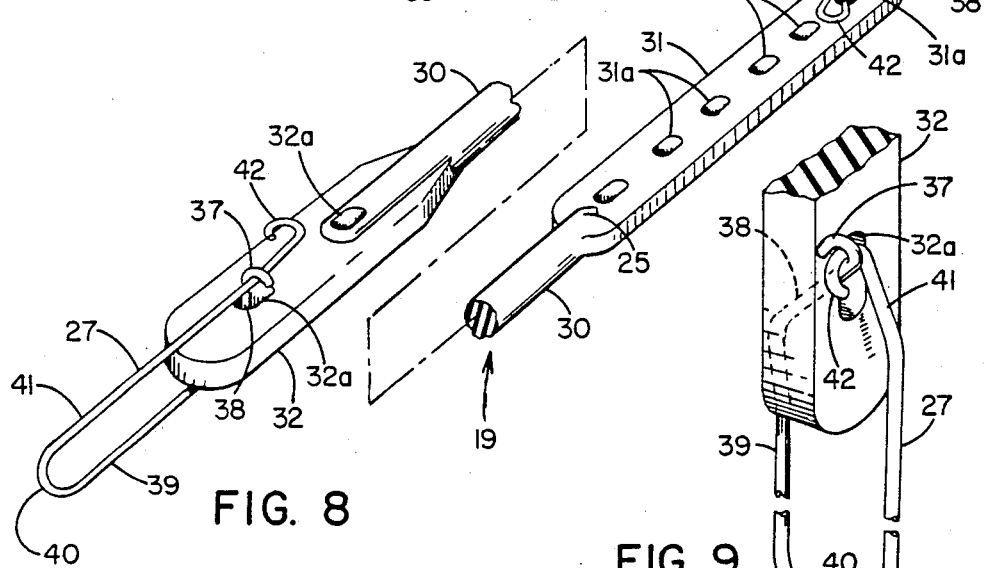
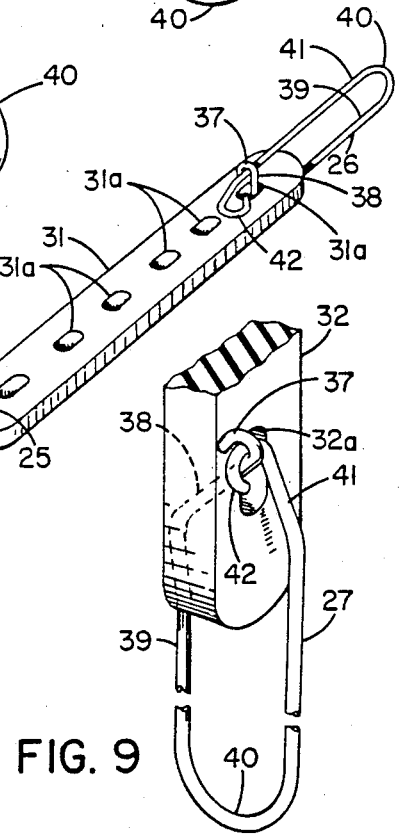

ADJUSTABLE AIR BRAKE HOSE SUPPORT FOR RAILWAY VEHICLES

FIELD OF THE INVENTION

This invention relates to an adjustable foolproof air brake hose support for railway vehicles and, more particularly, to a support arrangement employing an elongated elasticized cord having its respective remote ends formed with a series of longitudinally spaced holes for selectively accommodating an upper resilient wire clip for being securely attached to a lug on the coupler of a railway vehicle and for selectively accommodating a lower resilient wire clip for being securely attached to a lug on the glad-hand of the air hose for preventing the glad-hand of an uncoupled railway vehicle from being dragged on the track and for allowing the glad-hands of coupled railway vehicles to be easily and quickly uncoupled.

BACKGROUND OF THE INVENTION

It is common practice in railroad operations to provide a supporting device for suspending the glad-hand of an air brake hose assembly from the couplers of railway vehicles, particularly in freight cars which utilize hydraulic, spring or gas end-of-car cushioning devices or cushioned underframes. In the past, one end of a metal chain was suitably connected to the free end of the air hose while the other end of the metal chain was appropriately attached to the coupler of the railway vehicle. It has been found that the chain and connectors are susceptible to breakage, particularly in cars having long air hoses, which tend to travel a greater distance than the length of the chain during uncoupling of the cars. It is necessary and essential to alleviate this breaking problem, which allowed the air hose to be pulled along the trackway so that the lad-hand could be caught in wayside equipment thereby resulting in damage to the air brake hose assembly.

In order to provide a solution to this problem, it has been suggested to utilize a resilient or expandable air hose support which could stretch sufficiently during uncoupling operations without breaking, and which would retract to its normal length to support an uncoupled glad-hand and air hose at the required height above the top of the rail. Two different types of resilient air hose supports are shown and disclosed in U.S. Pat. No. 3,592,425, issued on July 13, 1971, for "Air Hose Support for Railway Cars" and in U.S. Pat. No. 3,784,030, issued on Jan. 8, 1974, for "Air Hose Support for Cushion Cars". While both of these resilient supports functioned satisfactorily under normal conditions, other supports did not possess all the necessary attributes and requirements which are essential to alleviate the problems that were and are currently occurring in the field. These field problems have caused the Association of American Railroads (AAR) to endeavor to adopt a testing criteria prior to approving any chainless hose support. In some oases, there are inferior resilient air hose supports which are susceptible to breakage and failure at some point, thereby allowing the glad-hand to drop and drag along on the trackway, where it is susceptible to being caught in switches, crossover, frogs, i.e., with resulting damage to the air hose assembly. Another shortcoming of previous air hose supports is the difficulty and excess time required for installation on a railway vehicle.

OBJECTS AND SUMMARY OF THE INVENTION

Accordingly, it is an object of this invention to provide a new and improved resilient air brake hose support for being connected between the coupler and the glad-hand of a railway vehicle.

Another object of this invention is to provide a unique air hose support employing a bungee having a series of elongated holes on each end for accommodating a wire clip connector for attachment to eyelet lugs on a coupler and a glad-hand.

A further object of this invention is to provide a novel adjustable air brake hose support including an elasticized cord having a plurality of end holes for selectively receiving latchable or lockable spring steel clips for connecting an air brake hose to the coupler of a railway vehicle.

Still another object of this invention is to provide an improved support arrangement for suspending an air brake hose from a railway car coupler with a bungee having selectively positioned wire clips, each of which includes a single post hook latch and a thumb lock loop.

Still a further object of this invention is to provide a significantly improved air hose supporting arrangement including, a resilient cord having a plurality of elongated openings located on each end for initially accepting a latching hook portion of a substantially rectangular spring clip, which has a loop portion having a dual function of acting as a thumb pad for latching and unlatching the hook portion and acting as a locking means for engaging the latching hook portion when a latched spring clip becomes excessively distorted.

Yet another object of this invention is to provide a unique spring wire clip connector including a shank portion having one end terminating in a hook portion, and having the other end extending perpendicular to a first elongated leg portion which continues to a bight portion leading to a second elongated leg portion terminating in a loop portion, which functions as a thumb tab for latching and unlatching the hook portion in relation to the second elongated leg portion, and which functions as a safety catch with the hook portion when the latched wire clip connector is excessively deformed.

Yet a further object of this invention is to provide an adjustable support for an air brake hose of a railway vehicle which is economical in cost, reliable in use, durable in service, simple in construction, easy to install, and effective in operation.

In accordance with the present invention, there is provided an adjustable support arrangement for suspending a flexible air brake hose assembly from a coupler of a railway vehicle comprising, an elasticized cord having a plurality of elongated openings formed in the respective ends, a spring wire clip connector threaded through a selected one of the plurality of elongated openings formed in each respective end, one of the spring wire clip connectors releasably attached to an eyelet lug on the coupler, and another of the spring wire clip connectors releasably attached to an eyelet lug on a glad-hand so that the air brake hose assembly is supported at a predetermined height above the top of a track rail, each of the spring wire clip connectors is substantially identical and includes a hook portion formed on one end and a loop portion formed on the other end, a shank portion leading from the hook portion and extending to a first elongated leg portion which is perpendicular to the shank portion, the first leg portion leading to a bight portion which communicates with a second elongated leg portion which joins the loop portion, which functions both as a thumb tab for latching and unlatching the hook portion with an intermediate portion of the second elongated leg portion and a safety lock with the hook portion when said spring wire clip connector is excessively deformed.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIGS. 5, 6, and 7 are partial progressive prospective views illustrating the manner in which the spring wire clip connector is secured to the end of the rubber bungee;

FIG. 8 is an isometric view, partly broken away, of the support as it is ready for shipment; and FIG. 9 is a partial prospective view of the lower end of the bungee, and a deformed spring wire clip connector having the hook and loop portions interlocked in a positive manner.

DETAILED DESCRIPTION OF THE INVENTION

Figure 1:
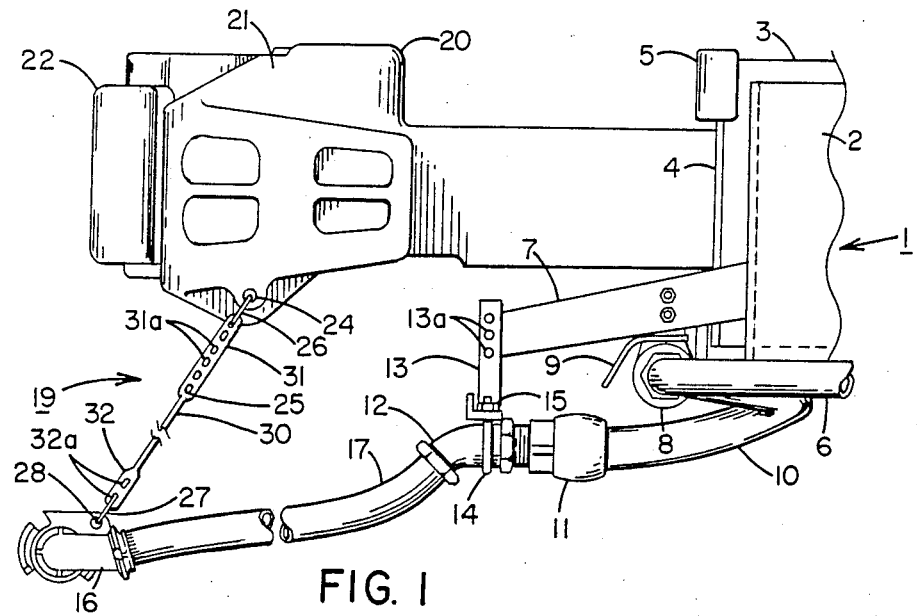
FIG. 1 is a side elevational view of one end of a railway vehicle showing the cushioned underframe, its coupler, and the air hose assembly in which the adjustable elastic support suspends the glad-hand from the coupler.

Referring now to the drawings, and in particular to FIG. 1, there is shown a portion of a railway vehicle generally characterized by numeral 1, Which has an end-of-car cushioning device or cushioned underframe 2 having a center sill 3 extending the length of the underframe 2. An end sill 4 forms part of the underframe 2 and includes a striker plate 5. A trainline is indicated at 6, which extends the length of the railway vehicle. A bracket 7 is suitably connected to the underframe 2, and is adapted to support the trainline 6. It will be appreciated that a suitable angle cock 8 is located adjacent the end sill 4, and includes a control or operating handle 9 having a self-locking feature to minimize the chance of accidental opening and closing of the valve. A flexible hose 10 is connected to each angle cock and extends rearward outwardly from the end sill 4, and is connected by a fitting 11 to a 45° pipe elbow 12. An adjustable hanger 13 is connected to the remote end of bracket 7 by bolts 13a. The elbow 12 is secured to the hanger 13 by a U-bolt 14 and nuts 15. An air hose assembly includes a metal fitting or glad-hand 16 which is suitably attached to the free end of a flexible air brake hose 17, the remote end of which is suitably coupled to the elbow 12. The glad-hand 16 is designed to provide for a quick and positive connection of the air brake hoses of adjacent railway vehicles.

As shown in FIG. 1, there is a standard AAR coupler 20 having a coupler head 21, a pivotal knuckle 22, and a coupler shank 23 which is suitably mounted in the center sill 3. The coupler head 21 is provided with a depending eyelet lug or apertured boss 24, which operates as a convenient means for suitably attaching an appropriate hose support. In the present instance, the hose support 19 takes the form of an elongated elasticized cord or rubber bungee 25 and includes a pair of spring wire clip connectors 26 and 27. It will be seen that the upper end of the bungee 25 is connected to the eyelet lug 24 by an upper latching clip 26, while the lower end of the bungee 25 is connected to the gladhand 16, which includes an eyelet lug 28. In practice, the length of the clip and bungee support 19 is adjusted by selectively placing the clips 26 and 27 through certain ones of a plurality of axially spaced holes 31a and 32a formed in the respective end 31 and 32 of the bungee, so that the glad-hand 16 of an uncoupled air hose is normally held at a height of between four inches (4") minimum and five inches (5") maximum above the top of the track rail.

The resilient stretchable elasticized cord, or elongated bungee 25, is preferably molded of a suitable memory retaining rubber material, such as, a special isoprene compound which has superior strength, extremely good memory, and excellent cold temperature properties. The rubber bungee 25 includes a long intermediate portion 30 having a circular cross-section and a pair of end portions 31 and 32, each having a rectangular cross-section. As shown in FIGS. 1, 5, 6, 7 and 8, the end portions 31 and 32 are each provided with a plurality of axially aligned elongated holes 31a and 32a, respectively. It will be seen that the plurality of elongated or oblong through holes 31a are equally spaced along the axial length of end portion 31, and that end portion 32 is conveniently shown having at least two (2) axially aligned, spaced apart elongated or oblong through holes 32a. Thus, the greatest amount of adjustment to vary the length of the support is accomplished at end 31 by moving the clip 26 from the outermost hole 31a to the innermost hole 31a. Further, the effective length may be shortened by moving clip 27 from the outermost hole 32a to the innermost hole 32a in end 32. The number of holes and their spacing may be changed and varied as desired.

Figure 2:
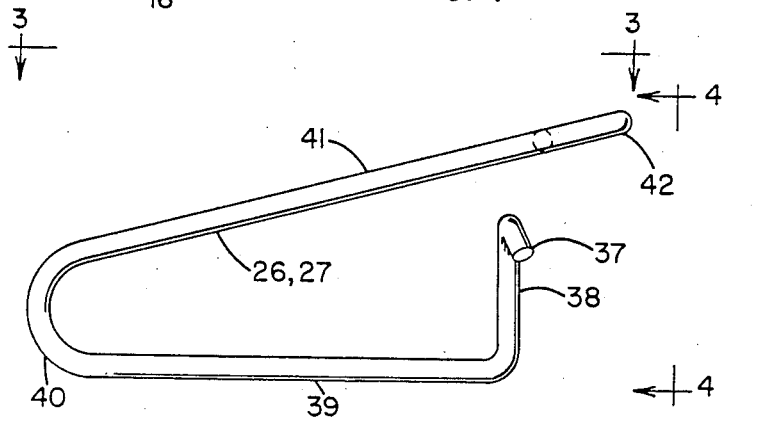
FIG. 2 is an enlarged side elevational view of a spring wire clip connector for connecting the support in place with one end of the support connected to the eyelet lug on the coupler, and with the other end of the support connected to the eyelet lug on the glad-hand.
Figure 4:
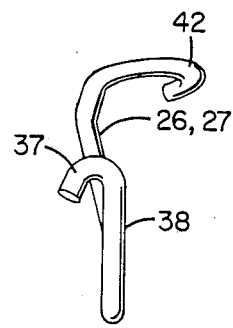
FIG. 4 is an end elevational view taken along line 4—4 of FIG. 2.
Figure 3:
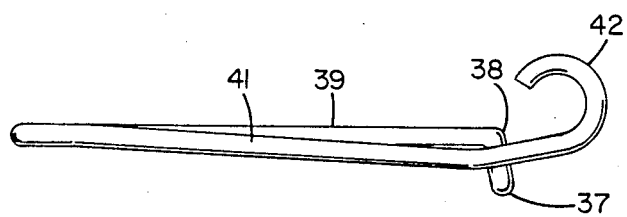
FIG. 3 is a top plan view taken along line 3—3 of FIG. 2.

In viewing FIGS. 2, 3 and 4, it will be appreciated that both of the spring wire clip connectors 26, 27 are substantially identically constructed and preferably made of suitable stainless or noncorrosive steel, or the like, having a circular cross-section. A latching hook portion 37 is formed on one end of the clips 26, 27 by reverse bending it. A straight shank portion 38 extends from the hook portion 37 and is bent at substantially ninety degrees (90°) to form a first elongated leg portion 39. The leg portion 39 converges into a substantially semicircular bight portion 40, which extends to a second elongated leg portion 41. The leg portion 41 terminates into an open loop portion 42, which functions as a depressible thumb tab as well as a safety lock, as will be described hereinafter. In viewing FIGS. 2 and 6, it will be noted that the second elongated leg portion 41 is normally urged or biased away from the hook portion 37 when the clips 26, 27 are in their unlatched condition due to the built-in spring tension.

The clip connectors 26 and 27 are adapted to be joined or applied to the respective ends 31 and 32 of the elastic bungee 30 in substantially the same manner. As shown in FIG. 5, the clip 27 is first situated such that the length of the legs 39 and 41 is perpendicular to the longitudinal axis of the elongated bungee 25, so that the hook portion 37 is initially aligned with the major axis of the elongated hole 32a, and then the hook and shank portion 38 are inserted through the hole 32a, as depicted by the phantom lines 37'. Next, the clip connector 27 is rotated approximately ninety degrees (90°) in a clockwise direction about the axis of the shank 38, so that the longitudinal axes of elongated legs 39 and 41 are aligned with the longitudinal axis of elongated bungee 25, as shown in FIG. 6. Now, the elongated leg 39 is grasped by the fingers of one hand, while the loop 42 is depressed by the thumb until the outer edge of the elongated leg 41 passes slightly beyond the tip of the hook portion 37. Now, a slight lateral force toward the direction of the shank portion 38 is exerted on the loop 42 and then the thumb tab 42 is released so that the leg 41 enters the hook portion 37, as shown in FIG. 7. Thus, the spring wire clip connector 27 is effectively latched and securely attached to the rubber bungee 25 and the entire support, as shown in FIG. 8, is ready for shipment to the customer.

It will be appreciated that the process of combining the clip connectors onto the bungee is substantially foolproof since there is one and only one way of assembly. It will be noted that the loop portion 42 is substantially larger than the hook portion 37, which is specifically designed to be inserted through the elongated holes 31a and 32a. Thus, it is virtually impossible to incorrectly assemble the clips onto the bungee. In addition, since the shank portion 38 is integral with the inserted hook portion 37, it is unnecessary to completely thread the clips from one end to the other end, which was the case in other clip assemblies. Thus, in the present invention, the clips are quickly and easily assembled.

Now, when the railroad customer receives the adjustable support and wishes to use the support on a railway vehicle, a maintainer, or other individual, opens the clips by grasping leg portion 39 with the fingers and depressing the loop tab or portion 42 until the outer edge of leg 41 clears the tip of the hook 37. At the same time, a slight lateral force, away from the shank portion 38, is exerted on the thumb tab 42, and the tab is released so that the spring force opens or unlatches the clip, as shown in FIG. 6. Next, the correct length of the support may be determined and, if necessary, the clips may be relocated to the appropriate holes 31a and 32a in the same manner as described above. If the clips 26 or 27 are inserted in any through hole other than the outermost through holes, the excess end portions of the bungee may be removed by a knife or other suitable cutting tool so that the elongated legs 39 and 41 may be aligned with the longitudinal axis of the bungee 25. Then, the open clip 27 is attached to the lug 28 of the glad-hand 16, by threading the open loop 42 through the eyelet or hole of the lug, and sliding the leg 41 through the eyelet until the bight portion 40 is engaged. The same procedure is followed for attaching the clip 26 to the eyelet lug 24 of the coupler 20. Thus, the adjustable support 19 effectively suspends the air brake hose assembly at the proper level above the top of the rail, yet it does not impede coupling and uncoupling operations.

As mentioned above, the loop portion 42 provides a sufficient amount of surface contact area to effectively function as a comfortable thumb tab for opening and closing the clip connectors, and also cooperates with the hook portion 37 to operate as a safety lock when the clip connector is excessively deformed or distorted, as shown in FIG. 9. Thus, the hook and loop portions are positively interlocked to prevent the unintentional opening of the clip connector. It will be appreciated that the radius of curvature of the loop 42 may be changed, namely, slightly increased to allow the open or free end of the loop to be threaded through the smaller than normal lug holes of some glad-hands.

Thus, the present invention has been described in such full, clear, concise and exact terms, as to enable any person skilled in the art to which it pertains to make and use the same, and having set forth the best mode contemplated for carrying out this invention. I state that the subject matter, which I regard as being my invention, is particularly pointed out and distinctly asserted in what is claimed. It will be understood that variations, modifications, equivalents, and substitutions for components of the above specifically described embodiment of the invention may be made by those skilled in the art without departing from the spirit and scope of the invention as set forth in the appended claims.

I claim:

1. An adjustable support arrangement for suspending a flexible air brake hose assembly from a coupler of a railway vehicle comprising, an elasticized cord having a plurality of elongated openings formed in the respective ends, a spring wire clip connector passed through a selected one of said plurality of elongated openings formed in each respective end, one of said spring wire clip connectors releasably attached to an eyelet lug on the coupler, and the other of said spring wire clip connectors releasably attached to an eyelet lug on a glad-hand, so that the air brake hose assembly is supported at a predetermined height above the top of a track rail, each of said spring wire clip connectors is substantially identical and includes a hook portion formed on one end and a loop portion means formed on the other end, a shank portion leading from said hook portion and extending to a first elongated leg portion which is perpendicular to said shank portion, said first leg portion leading to a bight portion which communicates with a second elongated leg portion which joins said loop portion means for operating as a thumb tab for being depressed during latching and unlatching of said hook portion with an intermediate portion of said second elongated leg portion and said loop portion means for operating as a safety lock with said hook portion when said spring wire clip connector is excessively deformed.

2. The adjustable support arrangement, as defined in claim 1, wherein said hook portion has a smaller radius of curvature than said loop portion means.

3. The adjustable support arrangement, as defined in claim 1, wherein said hook portion is initially threaded through the selected one of said plurality of elongated openings formed in each respective end of said elasticized cord.

4. The adjustable support arrangement, as defined in claim 1, wherein said hook portion is substantially perpendicular to the axis of said elongated leg portion.

5. The adjustable support arrangement, as defined in claim 2, wherein said loop portion means is an open loop which may be threaded through the eyelet lugs of the coupler and glad-hand.

6. The adjustable support arrangement, as defined in claim 1, wherein the outer diameter of said loop portion means is larger than the length of said elongated openings, so that the hook portion of the spring wire clip connector may only be threaded through said elongated openings.

7. The adjustable support arrangement, as defined in claim 5, wherein the opening of said loop portion means faces said hook portion, so that excessive deformation of said spring wire clip connector results in the interlocking of said hook portion with said loop portion means.

8. The adjustable support arrangement, as defined in claim 1, wherein said elasticized cord is made of a rubber compound.

9. The adjustable support arrangement, as defined in claim 1, wherein said elasticized cord is molded of an isoprene material.

10. The adjustable support arrangement, as defined in claim 1, wherein said spring wire clip connector is constructed of circular steel wire.

11. An air brake hose support comprising, an elongated elastic bungee having a plurality of oblong through holes formed on each respective end, a pair of resilient wire clips selectively attached to respective ones of said plurality of oblong through holes formed on each respective end, each of said pair of resilient wire clips including a hook portion and a thumb engaging loop portion means for being depressed during latching and unlatching means of said resilient wire clips and said loop position for being interlocked with said hook portion when said resilient wire clips are excessively deformed.

12. The air brake hose support, as defined in claim 11, wherein said hook portion of each resilient wire clip is initially threaded through selected ones of said plurality of oblong through holes.

13. The air brake hose support, as defined in claim 11, wherein said hook portion engages an intermediate portion of an elongated leg portion so that said resilient wire clip is latched.

14. The air brake hose support, as defined in claim 11, wherein said hook portion leads to a straight shank portion.

15. The air brake hose support, as defined in claim 14, wherein said straight shank portion is bent substantially at a right angle to form a first elongated leg portion.

16. The air brake hose support, as defined in claim 15, wherein said first elongated leg portion leads to a bight portion.

17. The air brake hose support, as defined in claim 16, wherein said bight portion leads to a second elongated leg portion.

18. The air brake hose support, as defined in claim 17, wherein said second elongated leg portion leads to said thumb engaging loop portion means.

19. The air brake hose support, as defined in claim 11, wherein said elongated elastic bungee is molded of an isoprene compound.

20. The air brake hose support, as defined in claim 11, wherein said elongated elastic bungee includes an intermediate portion having a circular cross-section and said respective end having a rectangular cross-section.

* * * * *

UNITED STATES PATENT AND TRADEMARK OFFICE
CERTIFICATE OF CORRECTION

PATENT NO. : 4,986,500
DATED : January 22, 1991
INVENTOR(S) : Ernest J. Campbell It is certified that error appears in the above-identified patent and that said Letters Patent is hereby corrected as shown below:

Column 7, line 28, delete "means" after the word unlatching line 29, after loop, delete "position" and insert --portion means--

Signed and Sealed this

Twentieth Day of July, 1993

Attest:

MICHAEL K. KIRK

Attesting Officer

Acting Commissioner of Patents and Trademarks